July 29, 1947.  R. C. KIRCHHOFF  2,424,891
THERMOSTATIC MIXER FOR LIQUIDS
Filed Dec. 29, 1943  2 Sheets-Sheet 2
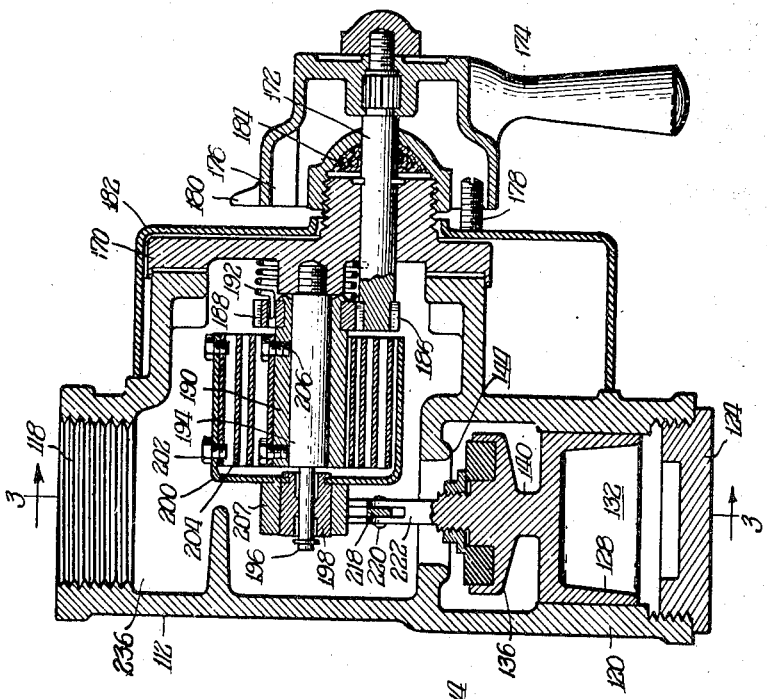
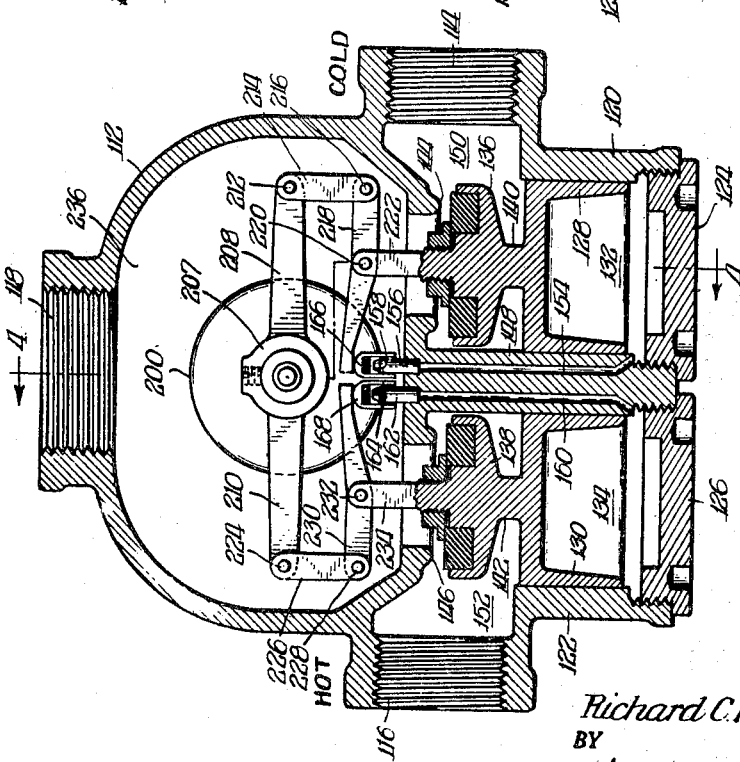
INVENTOR.
Richard C. Kirchhoff,
BY Patented July 29, 1947

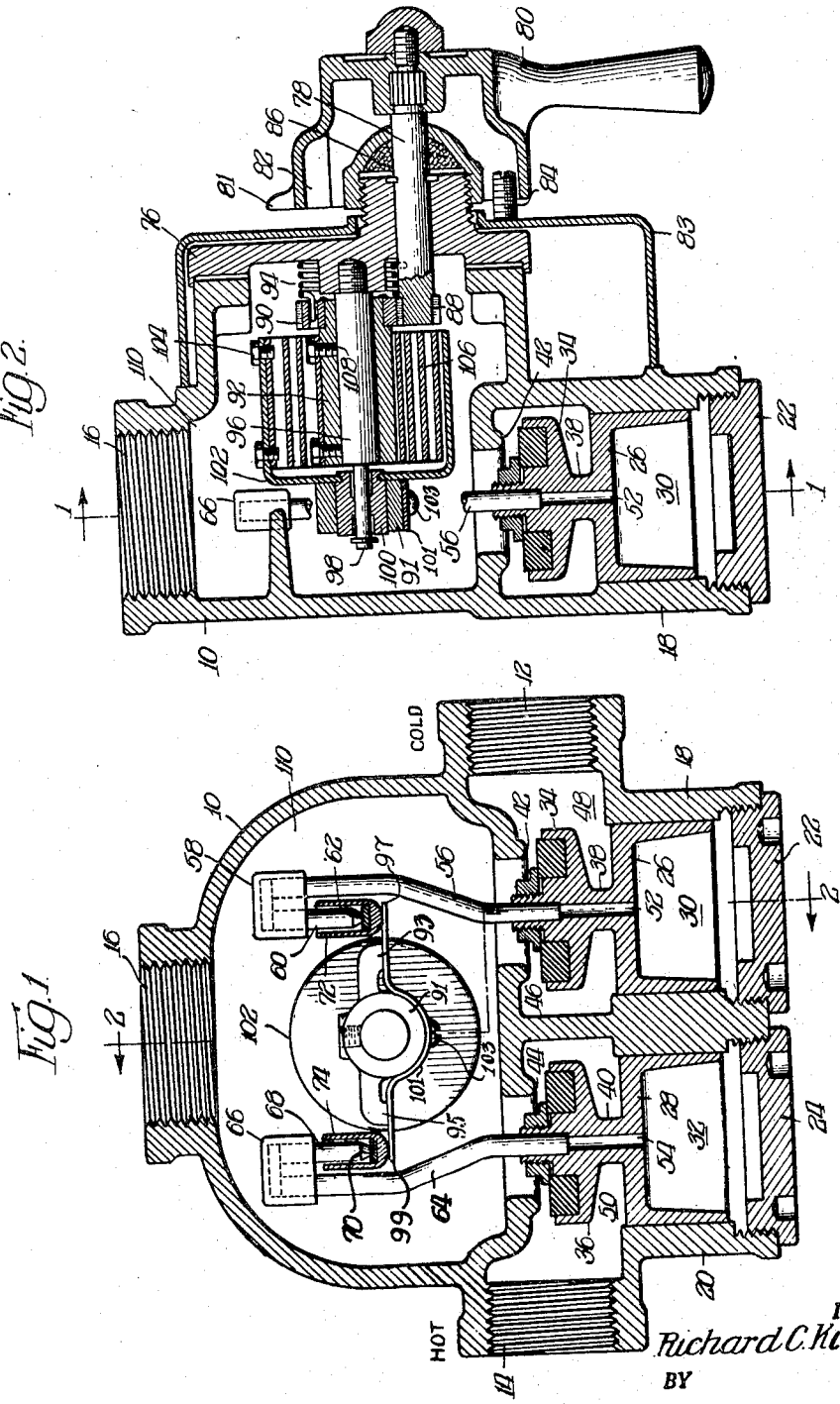

2,424,891

UNITED STATES PATENT OFFICE 2,424,891

THERMOSTATIC MIXER FOR LIQUIDS

Richard Carl Kirchhoff, Chicago, Ill., assignor to The Powers Regulator Company, Chicago, Ill., a corporation of Illinois Application December 29, 1943, Serial No. 516,038

9 Claims. (Cl. 236—12)

This invention pertains to control mechanism and more particularly, to piston type pilot operated control mechanism for water or other liquids.

There are many water installations where it is desirable to control the temperature of the water delivered and where water of different temperatures is mixed prior to delivery. For example, where gang showers are used, it is sometimes desirable to regulate the temperatures of banks of said showers so that water of only a certain temperature can be delivered. Also, in institutions where therapeutic work is carried on, this type of control also may be desirable.

There are two types of regulating valves on the market at the present time. One type is the bellows or diaphragm control member type in which the control member is provided with temperature sensitive liquid therein, which is affected by the temperature of the water supplied to the valve. There is an objection to this type, in that should the control liquid leak out of the control member, there is a tendency to deliver only hot water. Further, when the amount of water delivered is varied, there is need for different size control members for the control means, because if only one size member is used, there is a tendency for a hunting condition to occur on the smaller flows. Additionally, where the bellows type of mixing valve is used and where high pressures are handled, the controls must be large and consequently heavy. For example, in a valve having a capacity of 100 gallons per minute, the weight of the valve amounts to approximately 100 pounds. With valves embodying the herein disclosed inventions, this weight is reduced to approximately 25 pounds with the attendant saving in cost.

The second type of regulating valve which is at present used, makes use of a bi-metallic strip or coil for directly operating the control valves, but where this is done only a small valve can be controlled, as the bi-metallic coil is relatively weak and only a slide type of valve can be used, which tends to stick and become inoperative.

In neither of these types can a balanced control be obtained. Theoretically, a balanced control might be obtained by the use of a double seated valve, but actually this cannot be commercially done, because it is extremely difficult to cause the valves to seat at the same time under all temperature conditions. For example, if this seated condition can be attained when the valves are cold, it cannot be attained when the valves are hot.

It is, therefore, an object of this invention to provide a control valve assembly wherein the temperature sensitive means does not directly operate the control valve or valves.

Another object of the invention is to provide a mixing valve assembly adapted to be of light weight, yet capable of handling high flows.

Another object of the invention is to provide a mixing valve assembly having main control valves and pilot valves, the assembly being provided with control means indirectly controlling the operation of the main valves by operation of the pilot valves.

Another object of the invention is to provide a mixing valve operable to deliver liquid at a predetermined temperature which is not susceptible to fluctuation due to temperature or pressure changes.

Another object of the invention is to provide a mixing valve which is always stable in its operation, that is, prevents any substantial hunting action from being set up.

Another object of the invention is to provide a mixing valve wherein any change in pressure of the liquid delivered to the valve is neutralized and does not affect materially the delivered mixture.

Another object of the invention is to provide a mixing valve wherein a balanced control is attained without the use of double seated valves and, therefore, the valves are capable of attaining a tight shut-off condition.

Another object of the invention is to provide a mixing valve of large capacity, relatively simple construction with a wide range of positive performance.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a transverse sectional elevation of one form of mixing valve assembly embodying the invention, the section being taken substantially in the plane as indicated by the line 1—1 of Figure 2, this form of valve assembly being designated as the movable pilot type;

Figure 2 is a longitudinal sectional elevation of the valve assembly shown in Figure 1, the section being taken substantially in the plane as indicated by the line 2—2 of Figure 1;

Figure 3 is a transverse sectional elevation of a modified form of mixing valve assembly embodying the invention, the section being taken substantially in the plane as indicated by the line 3—3 of Figure 4, this form of valve assembly being designated as the fixed pilot type; and, Figure 4 is a longitudinal sectional elevation of the valve assembly shown in Figure 3, the section being taken substantially in the plane as indicated by the line 4—4 of Figure 3.

Referring first of all to the valve assembly illustrated in Figures 1 and 2, termed the movable pilot valve type of water control, the construction consists essentially of the valve housing or casing 10 having the cold water inlet 12, the hot water inlet 14 and the tempered water outlet 16. The inlets 12 and 14 are adapted to be connected through suitable piping (not shown) to their respective sources of supply, and the outlet 16 is adapted to be connected to suitable dispensing means (not shown). The housing is provided with a cold water piston cylinder 18 and the hot water piston cylinder 20, said cylinders being respectively closed by caps 22 and 24 and respectively having mounted therein the cold water piston 26 and the hot water piston 28, said pistons and cylinders forming, respectively, the cold water piston chamber 30 and the hot water piston chamber 32.

The pistons 26 and 28 are respectively provided with the cold water valve 34 and the hot water valve 36 connected to said pistons by means of the stems 38 and 40. The valves 34 and 36 are adapted to be seated on seats 42 and 44 respectively, the seats being separated by means of a wall 46 whereby a cold water chamber 48 and a hot water chamber 50 is provided.

The pistons 26 and 28 are so fitted that leakage occurs around the skirts thereof into the chambers 30 and 32. Piston 26, stem 38 and valve 34 are provided with a channel 52 extending therethrough and piston 28, stem 40 and valve 36 are provided with channel 54 extending therethrough. The valve 34 is provided with the vertical tube 56 communicating with the channel 52 and being carried by the valve and piston assembly 34—26, said tube extending upwardly into the return bend 58, said bend being provided with a bleed port tube 60 provided with the bleed port 62.

The valve 36 is provided with the vertical tube 64 communicating with the channel 54 and extending upwardly into the return bend 66. The return bend is provided with the hot water bleed port tube 68 having the hot water bleed port 70 provided therein. The tubes 60 and 68, respectively, are provided with the bleed or pilot valve members 72 and 74 adapted to have cooperative engagement with the ports 62 and 70 of the tubes 60 and 68.

The housing 10 is provided with the end closure or bonnet 76 in which the control shaft 78 is journaled, the control shaft being non-rotatably provided with the temperature adjusting handle 80 disposed outwardly of said bonnet and being rotatable between two positions determining the degree of temperature of the liquid delivered. The extreme positions of the handle are determined by engagement between the stop 82 provided on the handle and the stop 84 provided on the bonnet. The handle is provided with the index 81 readable against a dial (not shown) provided on the cover plate 83.

Stuffing box 86 is provided on the bonnet and the shaft 78 is provided with a gear 88 disposed inwardly of the housing and meshing with gear 90 non-rotatably provided on the bushing 92.

A spring 94 is interposed between the gear 90 and the bonnet to take up any lost motion between gears 90 and 88.

The bushing 92 is rotatably mounted on the pin 96 carried by the bonnet, said pin 96 being provided with a smaller projection 98 on which the bushing 100 is rotatably mounted. The bushing 100 is non-rotatably provided with a cup shaped shield 102, said shield being connected as at 104 to one end of the bi-metallic coil 106, the other end of said coil being connected as at 108 to the bushing 92. The shield 102 serves as a baffle for the thermostatic coil, preventing erosion as there is no direct impingement on the coil 106 of the hot and cold water flowing into the mixing chamber 110. It further causes a better mixing of the hot and cold water before it reaches the bi-metallic coil whereby there is a tendency for the same temperature water to affect the entire coil, and said shield being rotated by the metallic coil is the means for transmitting movement of the coil to the bushing 100. The thermostatic arm 91 is fixedly secured to the bushing 100 and is provided with the oppositely extending arms 93 aand 95 adapted to engage and move the resilient arms 97 and 99 of relief spring 101 secured to arm 91 as at 103, the resilient arms engaging the valves 72 and 74 for control of the ports 62 and 70.

Assuming the handle 80 to be set in a predetermined position wherein the ports 62 and 70 are open, and the valves 34 and 36 are open to admit the selected quantities of cold and hot water respectively to the mixing chamber 110, the pressure in chambers 48 and 50 will be a certain predetermined amount. The pressure in chamber 110, if water is flowing from port 16, is at a lesser pre-determined amount. Water from the chamber 110 will flow through the opened ports 62 and 70 into tubes 56 and 64 and thus to the chambers 30 and 32. Leakage occurring around the valve pistons 26 and 28 will then cause no movement of the valves 34 and 36 provided there are no changes in the assumed conditions.

If, however, there is an increase in the temperature of the hot water flowing into chambers 50 and 110 the bi-metallic coil will be affected to rotate the shield 102 and consequently the thermostatic arm 91 in a clockwise direction (Figure 1). Thus the valve 74 will tend to close the port 70 and the valve 72 will tend to open farther the port 62.

Less water will, therefore, flow from the chamber 32 into the chamber 110 through the tube 64 and channel 54 so that leakage past the piston 28 will raise the pressure in chamber 32. This increase in pressure will cause an upward movement of the valve 36 toward a closed position until finally when the valve 74 completely closes the port 70, the valve 36 will be completely seated. This will occur until such time as the increase in cold water past the valve 34, which in the meantime will have opened due to its opposite action to the valve 36, the port 62 being open, will cause a reverse or clockwise movement of the shield 102 by the thermostatic coil 106 which will tend to close the port 62 and open the port 70. This will permit opening of the valve 36 and a movement of the valve 34 toward closed position but not to closed position. If, then, the mixture of hot water and cold water in the chamber 110 is the set temperature, the valves will remain opened in their proper position. The opposite action will occur should there be an influx of cold water beyond that at which the device is set.

In the event there is an increase in pressure, for example, in the hot water line, so that the pressure in chamber 50 is increased, the effective area of the piston 28 (in the construction illustrated) being substantially twice as large as that of the valve 36, the valve 36 will be moved slightly (substantially negligible) toward open position. This is affected, however, as later described, as actually there is no substantial increase in flow. The increased amount of hot water due to the increase in pressure will affect the bi-metallic coil as above described, tending to rotate the arm 91 in a clockwise direction to move the valve 74 toward a position to close the port 70. This port, being closed or throttled, will cause less liquid to flow through the tube 64 and the channel 54 from the chamber 32 and, therefore, the liquid leaking past the piston 28 will move the piston upwardly to move valve 36 toward closed position. Therefore, less hot water will be supplied to the chamber 110 and until the proper temperature is attained in the chamber 110 the arm 91 will remain in position controlled by the thermostat 106. When the desired temperature is attained the thermostat 106 will then rotate the arm 91 in a counter-clockwise direction to move valve 74 toward open position permitting the liquid to flow out of the chamber 32 through channel 54 and tube 64. This then will open the valve 36 as above described in which position it will be maintained, provided the selected temperature is maintained in the chamber 110.

The valve construction as illustrated is compensating to pressure fluctuations due to the fact that should any pressure increase occur, for example, in chamber 50, the valve would tend to open due to the force exerted on the piston area being substantially twice as great as the valve area. However, any such tendency of downward movement tends also to close the port 70 so that the pressure in the chamber 32 is built up to equalize that in chamber 50 so that there is no substantial movement of valve 36. However, the pressure being increased will cause an increased flow of hot water into chamber 110 and will affect the bi-metallic coil to move valve 36 to the closed position as above described. In the event the hot water valve 36 (for example) became stuck in fully open position, the hot water would affect the thermostat which would tend to rotate in a clockwise direction to open the nozzle 82 to release the pressure below piston 30, causing the cold water valve to open. This would be permitted because of the resilient action of spring arm 101. Referring now to the valve assembly illustrated in Figures 3 and 4 termed the fixed pilot valve type of water control, the assembly consists essentially of a valve housing or casing 112 having the cold water inlet 114, the hot water inlet 116 and the tempered water outlet 118. As before, the inlets 114 and 116 are adapted to be connected through a suitable piping (not shown) to their respective sources of supply, and the outlet 118 is adapted to be connected to suitable dispensing means (not shown). The housing is provided with the cold water piston cylinder 120 and the hot water piston cylinder 122, said cylinders being respectively closed by the caps 124 and 126, and respectively having mounted therein the cold water piston 128 and the hot water piston 130, said pistons and cylinders forming, respectively, the cold water piston chamber 132 and the hot water piston chamber 134.

The pistons 128 and 130 are respectively provided with the cold water valve 136 and the hot water valve 138 connected to said pistons by means of the stems 140 and 142. The valves 136 and 138 are adapted to be seated on seats 144 and 146, respectively, the seats being separated by means of the wall 148 whereby a cold water chamber 150 and a hot water chamber 152 is provided. The pistons 128 and 130 are so fitted that leakage occurs around the skirts thereof into the chambers 132 and 134.

The wall 148 is provided with the channel or passage 154 communicating with the chamber 132 below the piston and said passage extends upwardly, and is provided with the bleed port tube 156 provided with the bleed port 158. Wall 148 is also provided with the channel or passage 160 communicating with the chamber 134 below the piston 130 and said channel extends upwardly and is provided with the bleed port tube 162 having the bleed port 164. The tubes 156 and 162, respectively, are provided with the bleed or pilot valve members 166 and 168 adapted to have cooperative engagement with the ports 158 and 164 of the tubes 156 and 162.

The housing 112 is provided with the end closure or bonnet 170 in which the control shaft 172 is journaled, the control shaft being non-rotatably provided with the temperature adjusting handle 174 disposed outwardly of said bonnet and being rotatable between the positions determining the degree of temperature of the liquid delivered. The extreme positions of the handle are determined by engagement between the stop 176 provided on the handle and stop 178 provided on the bonnet. The handle is provided with the index 180 readable against a dial (not shown) provided on the cover plate 182.

Stuffing box 184 is provided on the bonnet, and shaft 172 is provided with the gear 186 disposed inwardly of the housing and meshing with the gear 188 non-rotatably provided on the bushing 190. A spring 192 is interposed between the gear 188 and the bonnet to take up any lost motion between gears 188 and 186. The bushing 190 is rotatably mounted on the pin 194 carried by the bonnet, said pin being provided with a smaller projection 196 on which the bushing 198 is rotatably mounted. The bushing 198 is non-rotatably provided with a cup-shape shield 200, said shield being connected as at 202 to one end of the bi-metallic coil 204, the other end of said coil being connected as at 206 to the bushing 190. The shield serves the same function as shield 102, as before described.

The thermostatic arm 207 is fixedly secured to the bushing 198 and is provided with oppositely extending arms 208 and 210. Arm 208 is pivotally connected as at 212 to the link 214, which in turn is pivotally connected as at 216 to the outer end of lever 218. The lever 218 is pivotally connected as at 220, intermediate the ends thereof, to the stem 222 fixed to the valve 136, and the inner end of said lever 218 is adapted to contact the valve 166. Arm 210 is pivotally connected as at 224 to the link 226, the opposite end of said link being pivoted as at 228 to the outer end of lever 230. The lever 230 is pivotally connected as at 232, intermediate the ends thereof, to the valve stem 234 affixed to the valve 138 and the inner end of lever 230 is adapted to have cooperative engagement with valve 168. Thus the levers 218 and 230 provide means for controlling the ports 158 and 164.

Assuming the handle 174 to be set in a predetermined position wherein the ports 158 and 164 are open and the valves 136 and 138 are open to admit the selected quantities of cold and hot water, respectively, to the mixing chamber 236, the pressure in chambers 150 and 152 will be a certain predetermined amount. If water is flowing through the port 118, the pressure in chamber 236 will be a lesser predetermined amount than that in chambers 150 and 152. Water from chambers 132 and 134 will flow through passages 154 and 156 and ports 158 and 164 into chamber 236, and the leakage which occurs past the pistons 128 and 130 will then cause no movement of the valves 136 and 138 provided there are no changes in the assumed conditions.

If, however, there are changes, such as have already been described, with respect to the valve shown in Figures 1 and 2, the ports 158 and 164 will be affected, due to the operation of the thermostatic coil. That is, rotation of the thermostatic arm 207 in a clockwise direction, for example, causes the lever 230 to tend to close the port 164 through the valve 168, thus causing upward movement of the valve 138 in the manner already described. The valve 136 will tend to open and the device will seek a position of equilibrium. This device will also operate in the same manner, whether affected by temperature or pressure, as already described with respect to the assembly illustrated in Figures 1 and 2. The linkage is merely used as the tubes 156 and 162 are fixed, and, of course, the ratio of the arms of the linkage may be varied to obtain varying degrees of operation of the valves 166 and 168.

It is to be understood that I do not wish to be limited by the exact embodiments of the device shown, which are merely by way of illustration and not limitation as various and other forms of the device will, of course, be apparent to those skilled in the art without departing from the spirit of the invention or the scope of the claims.

I claim:

1. In a device of the character described, the combination of a casing having a cold liquid inlet, a hot liquid inlet, and a mixed liquid outlet, said casing having a cylinder disposed adjacent said cold liquid inlet and a cylinder disposed adjacent said hot liquid inlet, a piston slidably mounted in each of said cylinders, the pistons being separate whereby they are capable of independent movement with respect to each other, a valve seat adjacent each inlet providing with said casing and pistons, respectively, a cold liquid chamber and a hot liquid chamber, said pistons being fitted to permit leakage from the adjacent hot and cold liquid chambers to the space below said pistons, thereby tending to close said valves, a valve associated with each piston operated by the associated piston for seating on the respective seats, each valve being operable separately by its associated piston, said casing having a mixing chamber between said seats and outlet, thermostatic means in said mixing chamber for regulating said valves, and means extending into the mixing chamber for connecting the mixing chamber to the cylinder spaces below the pistons.

2. In a device of the character described, the combination of a casing having a cold liquid inlet, a hot liquid inlet, and a mixed liquid outlet, said casing having a cylinder disposed adjacent said cold liquid inlet and a cylinder disposed adjacent said hot liquid inlet, a piston slidably mounted in each of said cylinders, the pistons being separate whereby they are capable of independent movement with respect to each other, a valve seat adjacent each inlet providing with said casing and pistons, respectively, a cold liquid chamber and a hot liquid chamber, said pistons being fitted to permit leakage from the adjacent hot and cold liquid chambers to the space below said pistons, thereby tending to close said valves, a valve associated with each piston operated by the associated piston for seating on the respective seats, each valve being operable separately by its associated piston said casing having a mixing chamber between said seats and outlet, thermostatic means in said mixing chamber for regulating said valves, and means extending into the mixing chamber communicating with the cylinder spaces below the pistons and movable with the respective valves and controlled by said thermostat for connecting the mixing chamber to the cylinder spaces below the piston.

3. In a device of the character described, the combination of a casing having a cold liquid inlet, a hot liquid inlet, and a mixed liquid outlet, said casing having a cylinder disposed adjacent said cold liquid inlet and a cylinder disposed adjacent said hot liquid inlet, a piston slidably mounted in each of said cylinders, the pistons being separate whereby they are capable of independent movement with respect to each other a valve seat adjacent each inlet providing with said casing and pistons, respectively, a cold liquid chamber and a hot liquid chamber, said pistons being fitted to permit leakage from the adjacent hot and cold liquid chambers to the space below said piston, thereby tending to close said valves, a valve associated with each piston operated by the associated piston for seating on the respective seats, each valve being operable separately by its associated piston said casing having a mixing chamber between said seats and outlet, thermostatic means in said mixing chamber for regulating said valves, and means extending into the mixing chamber communicating with the cylinder spaces below the pistons and spaced from the respective valves and controlled by said thermostat for connecting the mixing chamber to the cylinder spaces below the piston.

4. In a device of the character described the combination of a casing having a cold liquid inlet, a hot liquid inlet and a mixed liquid outlet, a pair of cylinders each closed at one end, a piston mounted in each cylinder, the pistons being separate whereby they are capable of independent movement with respect to each other one of said pistons being adjacent said cold liquid inlet and the other of said pistons being adjacent the hot liquid inlet, the space between the pistons and the cylinder closures forming cold and hot liquid piston chambers, respectively, means forming a valve port having a valve seat adjacent each inlet where cold and hot liquid chambers are formed respectively, the space above said seats forming a mixing chamber, a separate valve connected to each piston and adapted to control the respective ports, each valve being operable separately by the piston connected thereto said pistons being fitted to permit leakage from the cold and hot liquid chambers to the respective piston chambers, thereby tending to close the valves, the effective area of the pistons in said liquid chambers being a predetermined amount larger than the effective port area, a bushing rotatably mounted on said mixing chamber, means disposed outwardly of the casing for rotating said bushing, a cup rotatably mounted with respect to said bushing, a thermostatic element mounted in said cup, one end of said element being secured to said bushing and the other end being secured to said cup whereby movement of said element in response to temperature changes moves the cup with respect to said bushing, and means controlled by movement of the cup for controlling movement of said pistons.

5. In a device of the character described, the combination of a casing having a cold liquid inlet, a hot liquid inlet, and a mixed liquid outlet, said casing having a cylinder disposed adjacent said cold liquid inlet and a cylinder disposed adjacent said hot liquid inlet, a piston slidably mounted in each of said cylinders, the pistons being separate whereby they are capable of independent movement with respect to each other a valve seat adjacent each inlet providing with said casing and pistons, respectively, a cold liquid chamber and a hot liquid chamber, said pistons being fitted to permit leakage from the adjacent hot and cold liquid chambers to the space below said piston, thereby tending to close said valves, a valve associated with each piston operated by the associated piston for seating on the respective seats, each valve being operable separately by its associated piston said casing having a mixing chamber between said seats and outlet, thermostatic means in said mixing chamber for regulating said valves, and means extending into the mixing chamber communicating with the cylinder spaces below the pistons and controlled by movement of the thermostat for controlling movement of the pistons.

6. In a device of the character described, the combination of a casing having a cold liquid inlet, a hot liquid inlet and a mixed liquid outlet, a pair of cylinders each closed at one end, a piston mounted in each cylinder, one of said pistons being adjacent said cold liquid inlet and the other of said pistons being adjacent the hot liquid inlet, the space between the pistons and the cylinder closures forming cold and hot liquid piston chambers, respectively, means forming a valve port having a valve seat adjacent each inlet where cold and hot liquid chambers are formed respectively, the space above said seats forming a mixing chamber, a valve connected to each piston and adapted to control the respective ports, said pistons being fitted to permit leakage from the cold and hot liquid chambers to the respective piston chambers, thereby tending to close the valves, the effective area of the pistons in said liquid chambers being a predetermined amount larger than the effective port area, a bushing rotatably mounted on said mixing chamber, means disposed outwardly of the casing for rotating said bushing, a cup rotatably mounted with respect to said bushing, a thermostatic element mounted in said cup, one end of said element being secured to said bushing and the other end being secured to said cup whereby movement of said element in response to temperature changes moves the cup with respect to said bushing, and means controlled by movement of the cup for controlling movement of said pistons, said last named means comprising a valve control member carried by each valve and extending into the mixing chamber for supplying liquid from said cold and hot liquid piston chambers to said mixing chamber.

7. In a device of the character described, the combination of a casing having a cold liquid inlet, a hot liquid inlet and a mixed liquid outlet, a pair of cylinders each closed at one end, a piston mounted in each cylinder, one of said pistons being adjacent said cold liquid inlet and the other of said pistons being adjacent the hot liquid inlet, the space between the pistons and the cylinder closures forming cold and hot liquid piston chambers, respectively, means forming a valve port having a valve seat adjacent each inlet where cold and hot liquid chambers are formed, respectively, the space above said seats forming a mixing chamber, a valve connected to each piston and adapted to control the respective ports, said pistons being fitted to permit leakage from the cold and hot liquid chambers to the respective piston chambers, thereby tending to close the valves, the effective area of the pistons in said liquid chambers being a predetermined amount larger than the effective port area, a bushing rotatably mounted on said mixing chamber, means disposed outwardly of the casing for rotating said bushing, a cup rotatably mounted with respect to said bushing, a thermostatic element mounted in said cup one end of said element being secured to said bushing and the other end being secured to said cup whereby movement of said element in response to temperature changes moves the cup with respect to said bushing, and means controlled by movement of the cup for controlling movement of said pistons, said last named means comprising valve controlled passages in said casing for supplying liquid from said cold and hot liquid piston chambers to said mixing chamber.

8. In a device of the character described, the combination of a casing having a cold liquid inlet, a hot liquid inlet and a mixed liquid outlet, a pair of cylinders each closed at one end, a piston mounted in each cylinder one of said pistons being adjacent said cold liquid inlet and the other of said pistons being adjacent the hot liquid inlet, the space between the pistons and the cylinder closures forming cold and hot liquid piston chambers, respectively, means forming a valve port having a valve seat adjacent each inlet where cold and hot liquid chambers are formed respectively, the space above said seats forming a mixing chamber, a valve connected to each piston and adapted to control the respective ports, said pistons being fitted to permit leakage from the cold and hot liquid chambers to the respective piston chambers, thereby tending to close the valves, the effective area of the pistons in said liquid chambers being a predetermined amount larger than the effective port area, a bushing rotatably mounted on said mixing chamber, means disposed outwardly of the casing for rotating said bushing, a cup rotatably mounted with respect to said bushing, a thermostatic element mounted in said cup, one end of said element being secured to said bushing and the other end being secured to said cup whereby movement of said element in response to temperature changes moves the cup with respect to said bushing, and means controlled by movement of the cup for controlling movement of said pistons, said last named means comprising valve controlled passages in said casing for supplying liquid from said cold and hot liquid piston chambers to said mixing chamber, said last named valves being controlled by a linkage connected to said cup and said first named valves.

9. In a device of the character described, the combination of a casing having a cold liquid inlet, a hot liquid inlet and a mixed liquid outlet, a pair of cylinders each closed at one end, a piston mounted in each cylinder, one of said pistons being adjacent said cold liquid inlet and the other of said pistons being adjacent the hot liquid inlet, the space between the pistons and the cylinder closures forming cold and hot liquid piston chambers, respectively, means forming a valve port having a valve seat adjacent each inlet where cold and hot liquid chambers are formed respectively, the space above said seats forming a mixing chamber, a valve connected to each piston and adapted to control the respective ports, said pistons being fitted to permit leakage from the cold and hot liquid chambers to the respective piston chambers, thereby tending to close the valves, the effective area of the pistons in said liquid chambers being a predetermined amount larger than the effective port area, a bushing rotatably mounted on said mixing chamber, means disposed outwardly of the casing for rotating said bushing, a cup rotatably mounted with respect to said bushing, a thermostatic element mounted in said cup, one end of said element being secured to said bushing and the other end being secured to said cup whereby movement of said element in response to temperature changes moves the cup with respect to said bushing, and means controlled by movement of the cup for controlling movement of said pistons, said last named means comprising valve controlled passages in said casing for supplying liquid from said cold and hot liquid piston chambers to said mixing chamber, said last named valves being controlled by levers engaging said last named valves, respectively, and being pivotally mounted on the respective first named valves, and an arm fixed to said cup and pivoted to said last named levers.

RICHARD CARL KIRCHHOFF.

REFERENCES CITED

The following references are of record in the file of this patent:

UNITED STATES PATENTS

| Number | Name | Date |
|---|---|---|
| 1,725,607 | Wolfard | Aug. 20, 1929 |
| 2,122,600 | Young | July 5, 1938 |
| 2,272,403 | Fields | Feb. 10, 1942 |
| 2,275,742 | Dillon | Mar. 10, 1942 |
| 1,932,148 | Schneider | Oct. 24, 1933 |
| 2,287,810 | Lund | June 30, 1942 |
| 1,869,663 | Cartier | Aug. 2, 1932 |
| 1,943,705 | Trubert | Jan. 16, 1934 |